(No Model.) 2 Sheets—Sheet 2.
G. A. PORTER.
EVAPORATING APPARATUS.
No. 351,651. Patented Oct. 26, 1886.
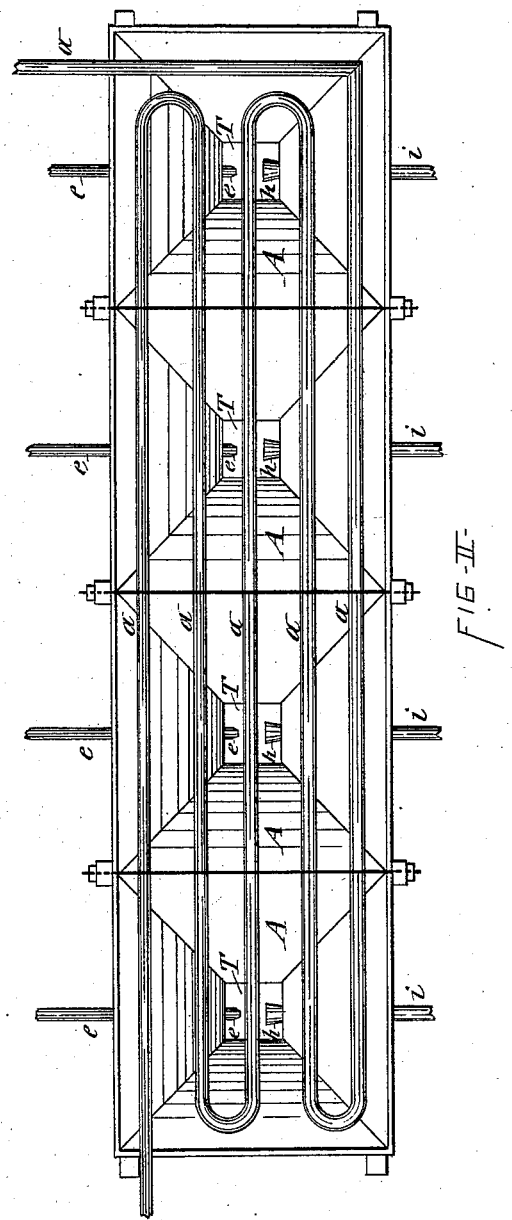
WITNESSES
C. Bendixon
A. F. Walz
INVENTOR
George A. Porter
per Duell, Laass & Hey
his Attys

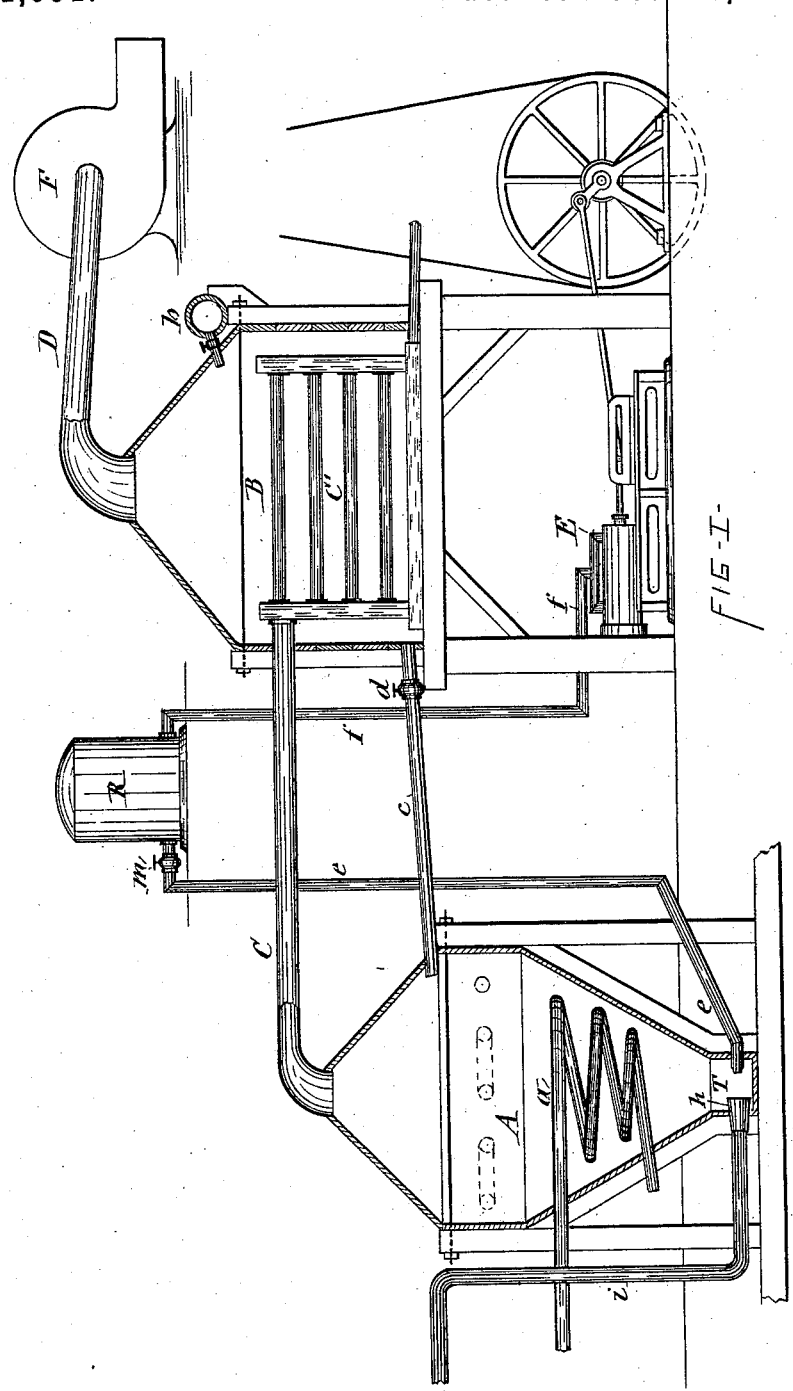

UNITED STATES PATENT OFFICE.

GEORGE A. PORTER, OF SYRACUSE, NEW YORK.

EVAPORATING APPARATUS.

SPECIFICATION forming part of Letters Patent No. 351,651, dated October 26, 1886.

Application filed February 13, 1886. Serial No. 191,788. (No model.)

*To all whom it may concern:*

Be it known that I, GEORGE A. PORTER, of Syracuse, in the county of Onondaga, in the State of New York, have invented new and useful Improvements in Evaporating Apparatus, of which the following, taken in connection with the accompanying drawings, is a full, clear, and exact description.

This invention relates to apparatuses for evaporating brine and other liquids by artificial heat, and it has special reference to the class of evaporating apparatuses in which the steam or vapor emitted from the liquid in one evaporating-tank is conducted through another liquid-containing tank for the purpose of heating the contents thereof.

The invention consists, chiefly, in novel appliances for removing the salt from the granulator, all as hereinafter fully described, and specifically set forth in the claims.

In the annexed drawings, Figure 1 represents a vertical section of an evaporating apparatus embodying my improvements, and Fig. 2 is a top plan view showing my invention employed in connection with a series of granulating-vats.

A is a tank, which is closed by a steam-tight cover, and intended to complete the process of evaporation or to reduce the substance under treatment to granular form or solid matter. The lower portion of this tank I form of the shape of a funnel or inverted cone or pyramid, terminating at its lower or small end in a pocket or trap, T, into the side of which projects the discharge end of a pipe, $e$, extended from a compressed-air reservoir, R, which is charged with air by means of a suitable air-compressing engine, E, the discharge-pipe $f$ of which is connected with the said reservoir.

Diametrically opposite the discharge end of the pipe $e$ in the trap T is the flaring mouth $h$ of a pipe, $i$, which is extended from said trap and rises at the outside of the tank A to an elevation slightly above the water-line of the said tank, and communicates with the place of deposit for the salt derived from the tank A.

Where more than one granulating-tank A is required, I arrange them side by side and without any partition between the upper vertical portion, so as to form a long continuous tank with a series of funnel-shaped depressions, each of which has at its bottom a pocket or trap, T, tapped by an air-blast pipe, $e$, and a discharge-pipe, $i$, as represented in Fig. 2 of the drawings.

$a$ denotes a pipe arranged in a coil or suitable tortuous course in the tank A, either in the funnel-shaped portion of the tank, as shown in Fig. 1 of the drawings, or in the upper portion of the tank, as represented in Fig. 2 of the drawings, said pipe being suitably connected either with a steam-generator to receive live steam, or with the exhaust-pipe of an engine to receive the exhaust-steam. Either of said connections of the pipe $a$ depends more or less on the position, construction, and style of the steam generator or engine, and requires only ordinary mechanical skill to effect it, and therefore it is deemed unnecessary to illustrate said feature in the annexed drawings. Said steam-pipe $a$ furnishes the requisite heat for reducing the brine or other liquid in the tank A to salt or other granular substance, which precipitates and becomes collected in the trap T, from whence it can be discharged whenever desired by turning the stop-cock $m$ of the pipe $e$ so as to open the passage through said pipe, thereby admitting a current of air from the compressed-air reservoir R into the trap T in a direction to enter the flaring mouth $h$ of the pipe $i$. The influx of the air-current forces the salt or granular substance from the trap T into the pipe $i$, and through said pipe to the place of deposit. So soon as it is found that an excessive amount of liquid accompanies the granular substance issuing from the discharge end of the pipe $i$, the stop-cock $m$ is to be closed. The reservoir R and its stop-cock $m$ are located above the water-line of the tank A for the purpose of isolating said stop-cock from the water, and thus guarding against leakage.

B represents another tank, which is also closed by a steam-tight cover, and preferably located higher than the tank A, so as to permit of conducting the liquid from the former to the latter by a pipe, $c$, connecting said tank and provided with a stop-cock, $d$, by which to control the flow of the liquid. Said tank B may be employed either for reducing the liquid to granular or solid matter or to preliminarily heat and partially evaporate the liquid before it enters the tank A. The contents of the tank B are heated by the vapor or steam conducted from the tank A through a duct, C, extended from the top of said tank through the tank B, in which latter I prefer to arrange said duct in a coil, C', or a tortuous course, so as to present a maximum heating-surface, one end of the coil C' being extended out from the tank to discharge the water of condensation.

b represents a pipe or suitable conduit which communicates with the tank B and conveys thereto the liquid to be evaporated. This liquid absorbs the heat from the coil C', and thereby condenses the vapor in said coil. The tank B thus becomes a condenser. The aforesaid condensation of the vapor in the coil C' serves to facilitate the escape of the steam or vapor from the tank A, and thus promote the evaporation of the liquid therein.

From the top or cover of the tank B is extended a duct, D, which is connected either with an exhaust pump or exhaust-fan, F, by means of which the steam or vapor is exhausted from the tank B, and a vacuum is produced over the liquid in said tank. Said vacuum materially aids the vaporization of the liquid under a comparative low temperature, and said low temperature accelerates the condensation of the vapor in the coil C'.

Having described my invention, what I claim as new, and desire to secure by Letters Patent, is—

1. The combination, with an evaporating-tank, of a discharge-pipe extended from the base of said tank, and an air-blast pipe projecting with its discharge end into the tank directly opposite the mouth of the discharge-pipe, substantially as and for the purpose set forth.

2. The combination of an evaporating-tank having its lower portion funnel-shaped and terminating in a trap, a discharge-pipe extended from the said trap, and an air-blast pipe projecting with its discharge end into the trap directly opposite the mouth of the discharge-pipe, substantially as described and shown.

3. The combination, with an evaporating-tank, of a trap at the base of said tank, a discharge-pipe tapping said trap, an air-compressing engine, a compressed-air reservoir connected with said engine, and a pipe extending from said reservoir into the aforesaid trap, substantially as described and shown.

In testimony whereof I have hereunto signed my name and affixed my seal, in the presence of two attesting witnesses, at Syracuse, in the county of Onondaga, in the State of New York, this 10th day of February, 1886.

GEORGE A. PORTER. [L. S.]

Witnesses:
C. H. DUELL,
E. C. CANNON.